356-125 SR
8/4/87 OR H 000,315

United States Statutory Invention Registration [19]

[11] Reg. Number: H315
[43] Published: Aug. 4, 1987

Genco et al.

[54] METHOD OF MEASURING OPTICAL PROPERTIES OF A TRANSPARENCY

[75] Inventors: Louis V. Genco, Enon; Harry L. Task, Dayton, both of Ohio

[73] Assignee: The United States of America as represented by the Secretary of the Air Force, Washington, D.C.

[21] Appl. No.: 607,090

[22] Filed: May 4, 1984

[51] Int. Cl.[4] ..... G01B 9/00
[52] U.S. Cl. ..... 356/125; 356/127
[58] Field of Search ..... 356/125, 126, 127; 358/107, 108

[56] References Cited

U.S. PATENT DOCUMENTS

| | | | |
|---|---|---|---|
| 1,241,612 | 10/1917 | Emerson | 356/125 |
| 3,880,525 | 4/1975 | Johnson | 356/127 |
| 3,981,589 | 9/1976 | Spitzberg | 356/127 |
| 4,051,458 | 9/1977 | Morton | 340/146.3 AG |
| 4,282,548 | 8/1981 | Plummer | 358/107 |

*Primary Examiner*—Stephen C. Buczinksi
*Assistant Examiner*—Linda J. Wallace
*Attorney, Agent, or Firm*—Bobby D. Scearce; Donald J. Singer

[57] ABSTRACT

A method of measuring optical properties of a transparency uses a video camera for focusing and then refocusing an image of a point source of light transmitted through a test region when the transparency is first absent and then later present at the test region. The distance the camera needs to be moved together with the focal length of a focusing lens used in carrying out the method provide sufficient quantitative data to calculate the spherical optical power of the transparency. Also, the camera generates video images of the point source both before and after the transparency is present in the test region. These images are displayed on a screen containing a grid pattern which facilitates measurement of the displacement of the image from the center of the grid or from the optical axis due to the presence of prismatic deviation in the transparency. Given the earlier data and supplemented by the latter displacement quantity, the prismatic deviation of the transpareny can also be calculated.

5 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MEASURING OPTICAL PROPERTIES OF A TRANSPARENCY

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to assessment of the optical quality of transparencies, such as helmet visors, and, more particularly, is concerned with a method of measuring spherical optical power and/or prismatic deviation of the transparency.

2. Description of the Prior Art

The Air Force provides protection of its pilots from secondary bird strike injuries by the use of a visor attached to the pilot's helmet. While there are military specifications for this visor, heretofore there has been no easily available, industry usable corresponding measurement procedure which can readily be used to determine if a visor meets military specifications concerning its optical properties, particularly the spherical power and prismatic deviation of the visor.

Consequently, a need exists for easy-to-use, reliable procedures for measuring optical properties of transparencies, such as helmet visors.

SUMMARY OF THE INVENTION

The present invention provides a measurement method designed to satisfy the aforementioned needs. The method utilizes individually conventional optical equipment to provide a relatively inexpensive means to measure spherical power and prismatic deviation of the visor in accordance with military specifications. Uniquely, these two optical properties can be measured more or less simultaneously by the technique of the present invention. In addition, it is possible to measure cylindrical power. Thus, a rapid and accurate method of testing the optical quality of the visors is provided.

Accordingly the present invention broadly provides a method of measuring spherical optical power of a transparency comprising the steps of: (a) collimating light along an optical axis from a point source thereof through a test region; (b) receiving the collimated light at a known location along the optical axis after the light has passed through the test region and producing a first image of the point source at a known distance "$f_L$" from the known location; (c) disposing a video camera at a first position along the optical axis where the camera is focused on the first image of the point source of light; (d) placing a transparency within the test region and along the optical axis at another location displaced from the known location by a known distance "d"; (e) receiving the collimated light at the known location along the optical axis after the light has passed through the transparency and producing a second image of the point source; (f) moving the video camera along the optical axis to a second position where the camera is focused on the second image of the point source of light; (g) measuring the distance "R" between the first and second positions of the video camera; and (h) calculating the spherical optical power of the transparency by solving for $\phi_v$, where $$\phi_v = \frac{\frac{1}{(f_L + R)} - \frac{1}{f_L}}{1 - \frac{d}{f_L}}.$$

However, if $d << f_L$, then the spherical optical power of the transparency may be approximated by solving for $\phi_v$, where $$\phi_v \approx \frac{-R}{f_L(f_L + R)}$$

Further, the prismatic deviation of the transparency may be measured through performance of a few additional steps. First, the video camera is used to generate a first video image of the point source of light with no transparency in the optical path at the test region. The first video image is then displayed on a screen at a known position on a grid pattern contained on the screen. Then, after the transparency is inserted in the optical path and the camera is moved to the second position, it is used to generate a second video image of the point source of light and the second video image is then displayed on the screen. Now, in addition to the "R" measurement, the distance "S" between the first and second video images as displayed on the grid pattern on the screen is measured. Then, the prismatic deviation of the transparency can be calculated by solving for $O_p$, where $$O_p = \arctan \frac{S}{f_L - R}.$$

DETAILED DESCRIPTION OF THE PREFERRED EMBODIMENT

Figure 1:
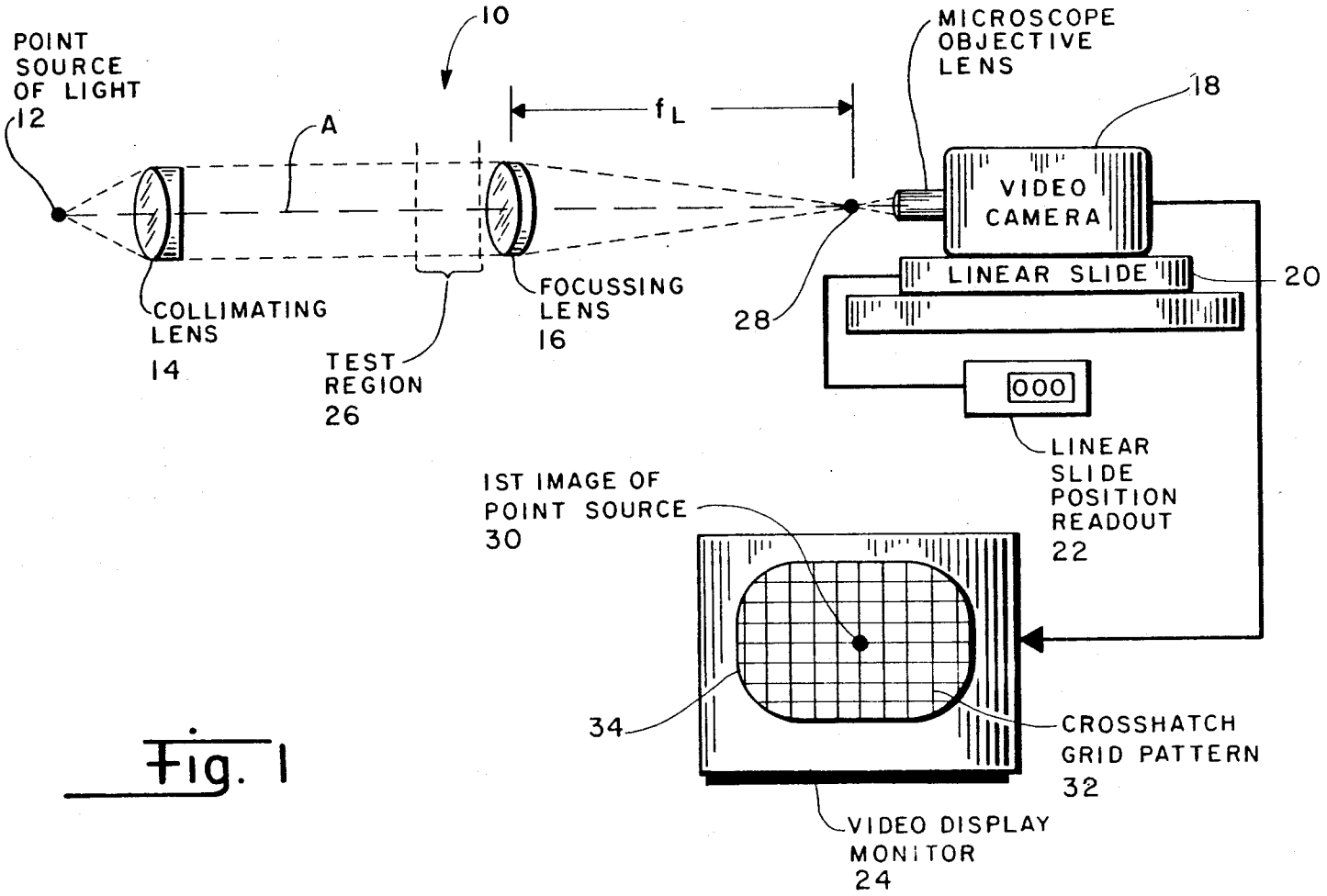
FIG. 1 is a schematical view of the system for carrying out the initial steps of the optical properties measuring method of the present invention without the presence of a transparency in the test region.

Referring now to the drawings, and more particularly to FIG. 1, there is shown the preferred embodiment of the optical properties measuring system for carrying out the method of the present invention, being generally designated 10. The measuring system 10 includes a point source of light 12, a collimating lens 14, a focusing lens 16, a video camera 18 (having a microscope objective lens), a linear slide 20, a linear slide position readout 22 and a video display monitor 24. The point source 12, lens 14, 16 and video camera 18 are all aligned along an optical axis A of the measurement system 10. All of the components of the system 10 are conventional, commercially available components.

The point light source 12 may be noncoherent light emitted by a small size ordinary penlight bulb. Light radiating from the point source 12 is collimated into a parallel wavefront by lens 14 and transmitted through a test region 26 located in front of a focusing lens 16. The latter lens 16 receives the wavefront and focuses a first image of the point source 12 at focal point 28 which is at a known distance, i.e. its focal length "$f_L$", from the lens 16.

Thus, without the transparency, e.g., the helmet visor, in place at the test region, the first image of the point source 12 is produced at a given distance $f_L$ from the focusing lens 16. The video camera 18 and linear slide position readout 22 are adjusted such that the point source image at 28 is in focus by camera 18 and a first video image 30 thereof is generated by camera 18 and displayed at the center of a grid pattern 32 contained on the screen 34 of the video display monitor 24. Also, the readout 22 is set to a reading of 000. The position of the linear slide 20 is precisely adjusted so that its axis is parallel with the optical axis A of the system 10.

Figure 2:
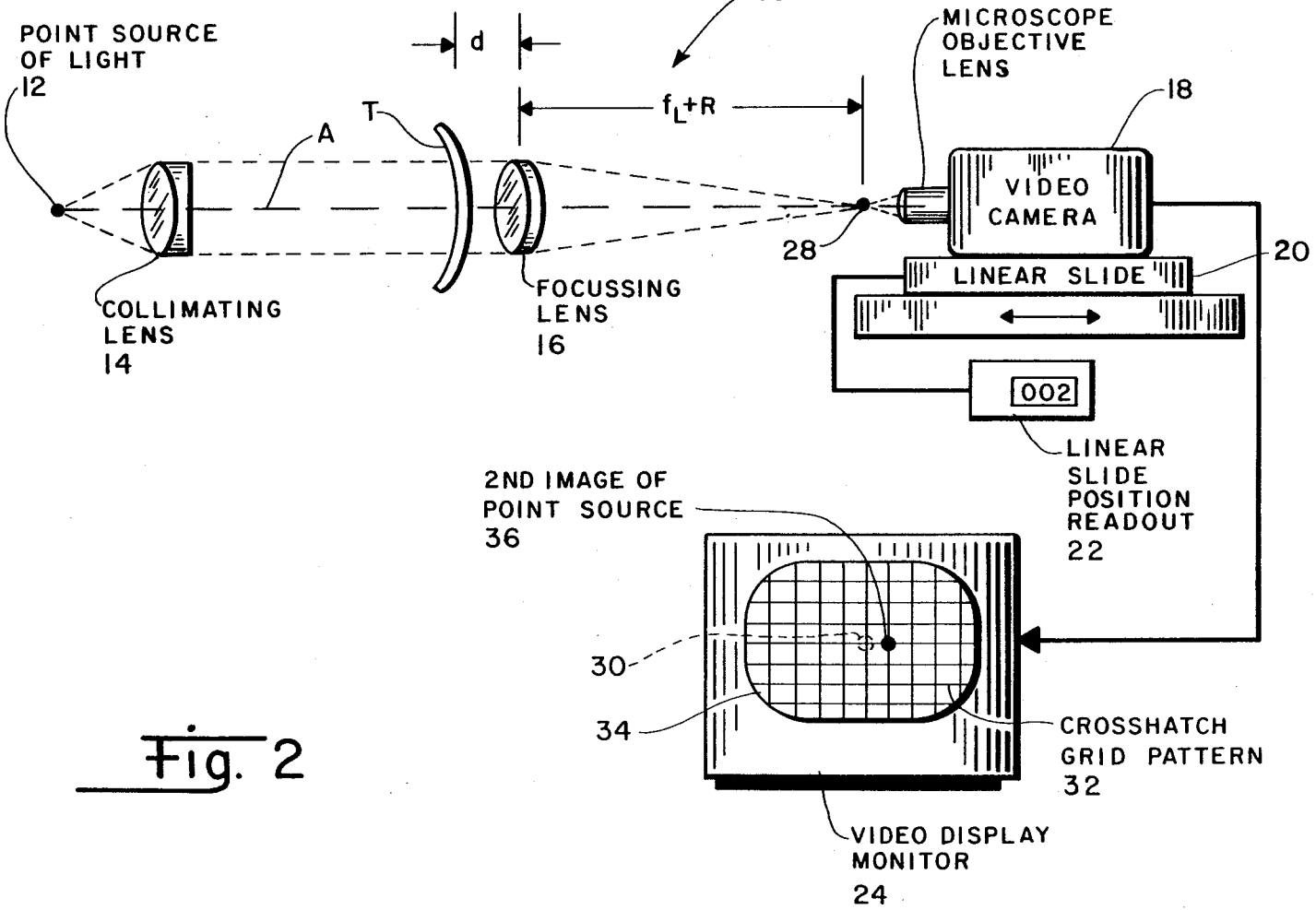
FIG. 2 is a schematical view of the system for carrying out the remaining steps of the method with the transparency disposed in the test region.

Once the system 10 is initially calibrated as described above without the transparency, in this case the helmet visor, being present, the transparency T is then inserted into the test region 26 in front of the focusing lens 16 displaced a known distance "d" therefrom as illustrated in FIG. 2. If this distance d is kept very small compared to focal length $f_L$ (such that $d << f_L$), then the calculations to be made later on can be simplified.

If the transparency T has some spherical power, then the image of the point source 12 of light focused by the lens 16 will be produced either closer to, or farther from, the lens 16 than point 28, depending upon whether the spherical power of the transparency is positive or negative respectively. The video camera 18 is moved along the optical axis A by moving the linear slide 20, until the second image of the point source 12 is brought into focus. This results in a new position reading on readout 22 of FIG. 2. The reading represents the distance "R" between the first (or initial) position of the camera (FIG. 1), and the new or second position thereof (FIG. 2). Alternatively, the optical components and transparency could be mounted on a common plalform whose displacement is measured relative to a fixed video camera.

The spherical optical power is then calculated using equation (1) or equation (2):

$$\phi_v = \frac{\frac{1}{(f_L + R)} - \frac{1}{f_L}}{1 - \frac{d}{f_L}}. \quad (1)$$

or if $d << f_L$, then $d/f_L$ is dropped and $$\phi_v \approx \frac{f_L - (f_L + R)}{f_L(f_L + R)} \approx \frac{-R}{f_L(f_L + R)} \quad (2)$$

The video camera 18 also generates another or second video image 36 of the second image of the point source. The second video image is displayed on the screen 34 of the monitor 24. The prismatic deviation of the transparency can be calculated by measuring how far from the center of the grid pattern 32 the second image 36 has moved. This is done with the aid of the cross hatch grid pattern lines. If the second image 36 is displaced a distance "S" from the optical center of the grid pattern 32 which was the location of the first image 30, then the magnitude of the prismatic deviation of the transparency T is calculated using equation (3):

$$O_p = \arctan \frac{S}{f_L - R}. \quad (3)$$

It is readily apparent that the measurements and calculations could be automated by employing an image digitizer connected to the video camera linear slide via a microcomputer.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A method of measuring spherical optical power of a transparency, comprising the steps of:

(a) providing a substantially point source of light;

(b) collimating light from said source and projecting the light so collimated along an optical axis from said source through a test region defined along said axis;

(c) receiving collimated light at a predetermined first location along said optical axis after the collimated light passes through said test region and focusing said collimated light to produce a first point image of said source at a first distance "$f_L$" from said first location, and measuring "$f_L$";

(d) disposing a video camera at a first position along said optical axis and focusing said camera on said first point image;

(e) placing a transparency within said test region and along said optical axis at a second location between said source and said first location, said second location being displaced from said first location by a predetermined distance "d";

(f) receiving collimated light at said first location along said optical axis after the collimated light passes through said transparency and test region and producing a second point image of said source;

(g) moving said video camera along said optical axis to a second position and focusing said camera on said second point image;

(h) measuring the distance "R" between said first position and said second position of said video camera; and (i) calculating the spherical optical power of said transparency by solving for $\phi_v$ where $$\phi_v = \frac{\frac{1}{(f_L + R)} - \frac{1}{f_L}}{1 - \frac{d}{f_L}}.$$

2. The spherical optical power measuring method as recited in claim 1, wherein said second location is selected to define d to be small compared to $f_L$ whereby the ratio $d/f_L$ is substantially negligible, and the spherical optical power of said transparency $\phi_v$ is calculated using the relationship, $$\phi_v \approx \frac{-R}{f_L(f_L + R)}$$

3. A method of measuring prismatic deviation of a transparency, comprising the steps of:

(a) providing a substantially point source of light;

(b) collimating light from said source and projecting the light so collimated along an optical axis from said source through a test region defined along said axis;

(c) receiving collimated light at a predetermined first location along said optical axis after the collimated light passes through said test region and focusing said collimated light to produce a first point image of said source at a first distance "$f_L$" from said first location, and measuring "$f_L$";

(d) disposing a video camera at a first position along said optical axis and focusing said camera on said first point image and generating a first video image of said first point image;

(e) displaying said first video image on a screen at a preselected position on a grid pattern contained on said screen;

(f) placing a transparency within said test region and along said optical axis at a second location between said source and said first location, said second location being displaced from said first location by a predetermined distance "d";

(g) receiving collimated light at said first location along said optical axis after the collimated light passes through said transparency and test region and producing a second point image of said source;

(h) moving said video camera along said optical axis to a second position and focusing said camera on said second point image and generating a second video image of said second point image;

(i) displaying said second video image on said grid pattern contained on said screen;

(j) measuring the distance "R" between said first position and said second position of said video camera;

(k) measuring the distance "S" between said first and second video images as displayed on said grid pattern on said screen; and (l) calculating the prismatic deviation of said transparency by solving for $O_p$, where $$O_p = \arctan \frac{S}{f_L - R}.$$

4. The prismatic deviation measuring method as recited in claim 3, further comprising the step of:

calculating the spherical optical power of said transparency by solving for $\phi_v$, where $$\phi_v = \frac{\frac{1}{(f_L + R)} - \frac{1}{f_L}}{1 - \frac{d}{f_L}}.$$

5. The prismatic deviation measuring method as recited in claim 3, wherein said second location is selected to define d to be small compared to $f_L$ whereby the ratio $d/f_L$ is substantially negligible, and further comprising the step of:

calculating the spherical optical power of said transparency by solving for $\phi_v$, where $$\phi_v \approx \frac{-R}{f_L(f_L + R)}$$

* * * * *